(12) United States Patent
Gangi

(10) Patent No.: US 6,938,821 B2
(45) Date of Patent: Sep. 6, 2005

(54) METHOD AND APPARATUS FOR ASSOCIATING IDENTIFICATION AND PERSONAL DATA FOR MULTIPLE MAGNETIC STRIPE CARDS OR OTHER SOURCES

(75) Inventor: Frank J. Gangi, Frisco, TX (US)

(73) Assignee: E-Micro Corporation, Frisco, TX (US)

( * ) Notice: Subject to any disclaimer, the term of this patent is extended or adjusted under 35 U.S.C. 154(b) by 0 days.

(21) Appl. No.: 10/052,405

(22) Filed: Jan. 17, 2002

(65) Prior Publication Data

US 2002/0139849 A1 Oct. 3, 2002

Related U.S. Application Data

(63) Continuation-in-part of application No. 09/664,205, filed on Sep. 18, 2000, now Pat. No. 6,402,029.

(51) Int. Cl.[7] ................................................. G06K 5/00
(52) U.S. Cl. ...................... 235/380; 235/375; 235/379; 235/381; 235/383
(58) Field of Search ................................ 235/375, 379, 235/382, 383, 487, 492, 381, 380; 705/14, 70–75

(56) References Cited

U.S. PATENT DOCUMENTS

| | | | |
|---|---|---|---|
| 4,701,601 A | 10/1987 | Francini et al. | |
| 4,705,211 A | 11/1987 | Honda et al. | |

(Continued)

FOREIGN PATENT DOCUMENTS

| | | |
|---|---|---|
| EP | 0656600 | 6/1995 |
| WO | WO 98/10363 | 3/1998 |
| WO | WO 98/12675 | 3/1998 |

OTHER PUBLICATIONS

Towitoko Electronics, "Product Overview Smartcard Terminals & Systems", Feb.

(Continued)

*Primary Examiner*—Ahshik Kim
(74) *Attorney, Agent, or Firm*—Bracewell & Giuliani LLP

(57) ABSTRACT

A method and apparatus for warehousing information in a wallet consolidator, including personal identification data for facilitating a transaction. The wallet consolidator includes a controller for controlling operation of the wallet consolidator, a magnetic stripe reader/writer for reading and writing magnetic stripes, a bar code scanner for scanning bar codes, a keypad for inputting user selections and commands, a memory for storing information provided to the wallet consolidator, a smart card interface for effectuating communication between the wallet consolidator and a smart card and a display screen for displaying text and graphics, the display screen further for displaying a bar code pattern capable of being scanned by a bar code reader. To store information in the wallet consolidator, or alternatively in a smart card interfaced to the wallet consolidator, information is read from magnetic stripes on various types of cards such as, but not limited to, credit, debit and identification cards. Additionally, images of the cards including, but not limited to, signatures and portraits are downloaded and stored. A user retrieves the information from any of the stored magnetic stripes and writes the information to a single magnetic stripe for use in a point of sale transaction. Similarly, stored images are retrieved and displayed on a display screen including a bar code which can be scanned by a bar code scanner.

14 Claims, 5 Drawing Sheets

U.S. PATENT DOCUMENTS

| | | | |
|---|---|---|---|
| 4,837,422 A | | 6/1989 | Dethloff et al. |
| 4,868,376 A | | 9/1989 | Lessin et al. |
| 5,095,196 A | | 3/1992 | Miyata |
| 5,135,095 A | | 8/1992 | Kocznar et al. |
| 5,276,311 A | | 1/1994 | Hennige |
| 5,578,808 A | * | 11/1996 | Taylor ........................ 235/380 |
| 5,585,787 A | | 12/1996 | Wallerstein |
| 5,832,457 A | * | 11/1998 | O'Brien et al. ................ 705/14 |
| 5,895,903 A | | 4/1999 | Abe et al. |
| RE36,365 E | | 11/1999 | Levine et al. |
| 6,070,147 A | * | 5/2000 | Harms et al. .................. 705/14 |
| 6,131,811 A | | 10/2000 | Gangi |
| 6,189,787 B1 | | 2/2001 | Dorf |
| 6,282,522 B1 | * | 8/2001 | Davis et al. ................... 705/41 |
| 6,293,462 B1 | | 9/2001 | Gangi |
| 6,402,029 B1 | | 6/2002 | Gangi |
| 6,456,984 B1 | * | 9/2002 | Demoff et al. ................ 705/40 |
| 6,473,500 B1 | | 10/2002 | Risafi et al. |
| 6,581,827 B2 | * | 6/2003 | Welton ........................ 235/380 |
| 6,631,849 B2 | * | 10/2003 | Blossom ...................... 235/492 |

OTHER PUBLICATIONS

Vedder, Dr. Klaus and Dr. Franz Weikmann, "Smart Cards—Requirements, Properties and Applications", 1998.

"ActivCard", ActivCard, Inc., 1998.

"Value–Checker CP", OKI Advanced Products, OKI America, Inc., 1998.

"Logismart Chipcard Readers—Worth Your Attention", Logis Chipcard Products, 1998.

"Setpurse", Sectec Oy, 1998.

"NURI Smart Card Solutions", NURI Information & Communication, Inc., 1998.

"Visa Smart", Visa U.S.A.

* cited by examiner

| | RECORDING DENSITY (bits per inch) | CHARACTER CONFIGURATION (including parity bit) | INFORMATION CONTENT (including control characters) |
|---|---|---|---|
| TRACK 1 IATA | 210 BPI | 7 BITS PER CHARACTER | 79 ALPHANUMERIC CHARACTERS |
| TRACK 2 ABA | 75 BPI | 5 BITS PER CHARACTER | 40 NUMERIC CHARACTERS |
| TRACK 3 THRIFT | 210 BPI | 5 BITS PER CHARACTER | 107 NUMERIC CHARACTERS |

*FIG. 2.*

76 ALPHA NUMERIC DATA CHARACTERS

| SS | FC | PAN | FS | NAME | FS | ADDITIONAL DATA | | DISCRETIONARY DATA | | ES | LRC |
|---|---|---|---|---|---|---|---|---|---|---|---|
| | | Primary Account No. (19 digits Max) | | Name (26 alphanumeric characters Max) | | | NO. OF CHARACTERS | | NO. OF CHARACTERS | | |
| | | | | | | Expiration Date (YYMM) | 4 | PVK1 | 1 | | |
| | | | | | | Service Code | 3 | PW OR Offset | 4 | | |
| | | | | | | | | CW or CVC | 3 | | |
| | | | | | | | | Some or all of the above fields may be found within the Discretionary data. | | | |

*FIG. 3.*

← 104 ALPHA NUMERIC DATA CHARACTERS →

| SS | FC | PAN | FS | USE AND SECURITY DATA | ADDITIONAL DATA | ES | LRC |

Primary Account No. (19 digits Max)

USE AND SECURITY DATA

| | NO. OF CHARACTERS |
|---|---|
| Country Code (opt.) | 3 |
| Currency Code | 3 |
| Currency Exponent | 1 |
| Amount Authorized per Cycle | 4 |
| Amount Remaining this Cycle | 4 |
| Cycle Begin (Validity Dates) | 4 |
| Cycle Length | 2 |
| Retry Count | 1 |
| PIN Control Parameters | 6 |
| Interchange Control | 1 |
| PAN Service Restriction | 2 |
| SAN-1 Service Restriction | 2 |
| SAN-2 Service Restriction | 2 |
| Expiration Date (opt.) | 4 |
| Card Sequence Number | 1 |
| Card Security Number (opt.) | 9 |

ADDITIONAL DATA

| | NO. OF CHARACTERS |
|---|---|
| First Subsidiary Account Number (opt.) | |
| Secondary Subsidiary Account Number (opt.) | |
| Relay Marker | 1 |
| Cryptographic Check Digits (opt.) | 6 |
| Discretionary Data | |

FIG. 5.

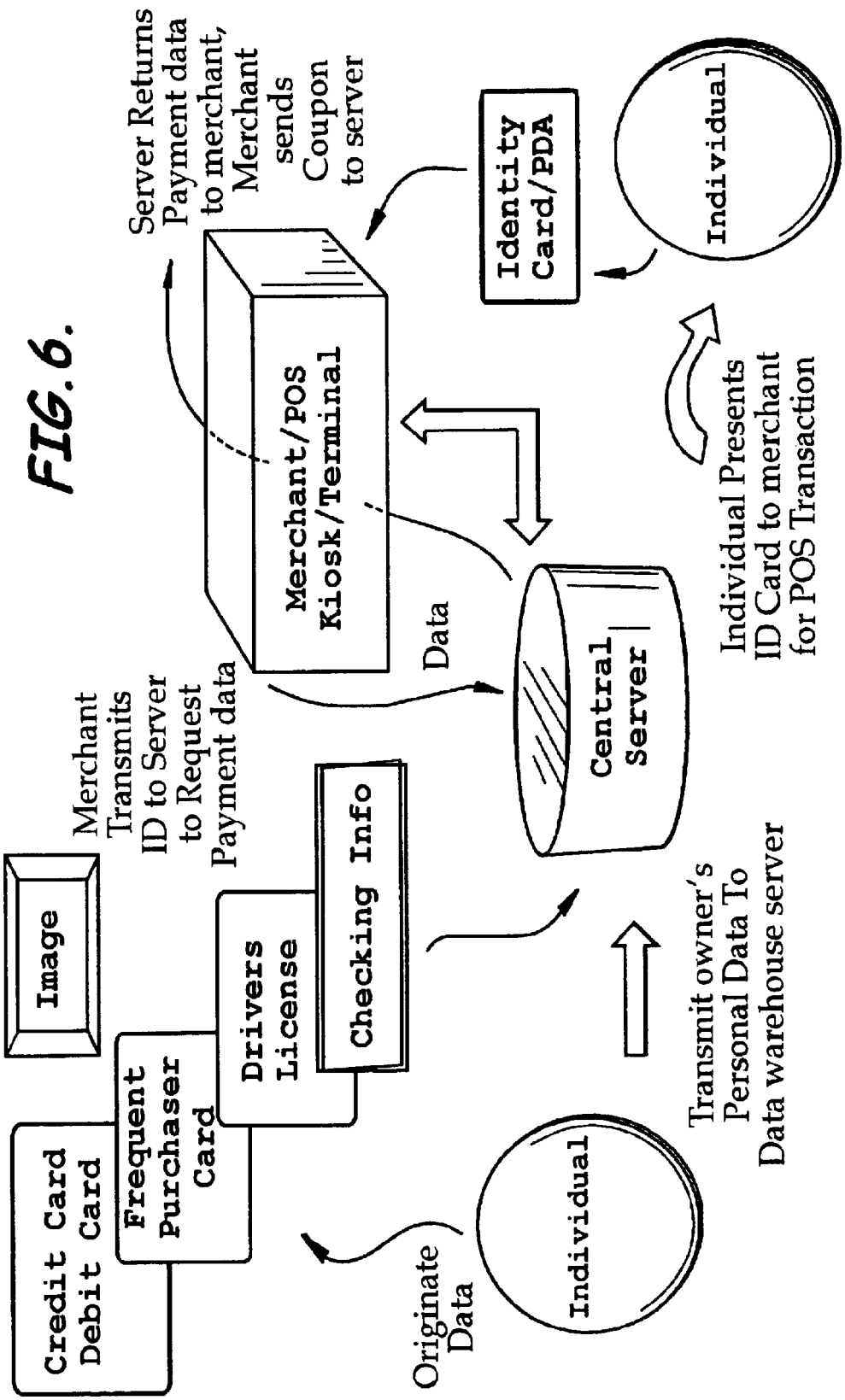

METHOD AND APPARATUS FOR ASSOCIATING IDENTIFICATION AND PERSONAL DATA FOR MULTIPLE MAGNETIC STRIPE CARDS OR OTHER SOURCES

CROSS REFERENCE TO RELATED APPLICATION

This application is a continuation-in-part of U.S. patent application Ser. No. 09/664,205 filed Sep. 18, 2000 now U.S. Pat. No. 6,402,029, for which a notice of allowance has been issued, and hereby incorporates by reference all material therein.

TECHNICAL FIELD THE INVENTION

This invention relates generally to an improvement for the use of magnetic striping on devices such as credit cards and the like, and in particular, but not by way of any limitation to a methodology and improved magnetic stripe card which is capable of encoding additional information other than that originally presented on the card, particularly identification and personal data.

BACKGROUND OF THE INVENTION

In today's electronic commerce there has been a proliferation in the use of various types of credit, debit, identification and other types of authorization cards. For example, an average individual is likely to carry a driver's licence, several credit and/or debit cards, an identification card for access to a health club, an identification card to gain access to a place of employment and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allow for easy and efficient electronic commerce, the number of such cards quickly becomes cumbersome and many individuals find carrying the large number of cards inconvenient.

Prior art magnetic stripe credit cards and the like have various limitations. For example, virtually all the prerecorded magnetic stripe cards that are currently in use are used for a single purpose. For example, a credit card or an identity card is generally used for just that purpose alone. In many instances, owners and users of these type of cards need to present several cards in order to maximize or complete a given transaction. Specifically, a discount card such as is used in certain supermarkets as well as the credit card to make the purchase must be both presented so as to obtain the discount.

Various solutions such as providing a sticker which can be placed on a credit card or the like have been suggested, however, these defeat the purpose of having an increased level of automation for check outs for example.

There are many instances whereby an individual, consumer, entity, organization, etc., would find it desirable to provide others with a secure, customized set of Id data that would facilitate a transaction and or event of a specific type. Additionally, the receiver of the data for the transaction may wish to provide complimenting and supplemental data back to the originator of the transaction and all such transactions being done in a digitized format to be interpreted, manipu lated and/or displayed on Point-of sale transaction(POS) devices/computers both at the POS and remotely. Additionally, the process of initializing this secure transaction would be more flexible if the acceptors of the transaction could utilize a Magnetic stripe card that could combine a unique identifying code with the standard ISO data from other completely different financial or other card's magnetically striped data.

Accordingly, the inventor herein proposes a solution which is both cost efficient and time efficient and which allows the use of conventional types of magnetic stripe readers which are currently being used in most retail establishments. One embodiment of the present invention allows for a single swipe of the card through the magnetic strip reader to provide all the information in one pass. This can be accomplished by recording onto the conventional magnetic strip of the credit card, the desired data from multiple cards and other sources which are necessary to complete a chosen transaction. In particular, a secure, customized set of identification data may be used to facilitate a transaction or even of a specific type.

SUMMARY OF THE INVENTION

This invention uses a method and apparatus for providing onto the magnetic stripe of a card additional information and consolidating multiple information from multiple cards as well as other sources onto the magnetic stripe card. In order to do so, a wallet consolidator, such as that shown in co-pending U.S. patent application Ser. No. 09/087,193 filed May 29, 1998 (for which a Notice of Allowance has been issued), could be employed. Although other types of readers and writers could be used to generate this data, this invention should in no way be considered to be limited to the use of any specific wallet consolidator or other means such as is mentioned above. Specifically, a device such as a wallet consolidator can be used in which the magnetic stripe information from multiple credit cards can be read from what is generally the commonly used three ISO/8711 tracks that are present on the card. However, it should be noted that in many types of credit cards one or more of these tracks may have no data provided on the card. What then can be accomplished is the reading of multiple tracks from multiple cards storing this all in memory and then rewriting the information to either a blank card or to the existing card after erasing the information along with, if necessary, additional "foreign" data onto the card. In an other embodiment it may be possible to write the additional foreign data on an existing card without an erasure and re-writing of the data, however this is not the preferred mode of operation.

In one embodiment of this invention, a secure, customized set of personal identification data is placed at the end of any data which was originally on the track or on an empty track. It may also be placed at any other position that the reading software in a point of sale (POS) terminal would have or would find to be ideal, this could also be at the front of a track for example or embedded within the track. The data of each track is formatted with a start sentinel character followed by the data itself followed by a stop sentinel. This data is then used to facilitate a transaction and/or event of a specific type. Conventional magnetic swipe readers look for the start or stop sentinel to indicate that a body of data follows. It should be noted however, that some readers will read the data irrespective of which way the card is swiped through the reader. The electronic circuitry in these types of readers detect the direction of the swipe by noting whether a start or stop sentinel is received first. This means that foreign data placed after the stop sentinel will not be recognized if it is not bracketed by standard start and stop sentinels.

The ISO-8711 standard specifies that at least two machine control codes for each type of track specifically, the types of tracks can be for example 75 or 210 bpi. These control codes and be used to bracket the foreign data. It would then be possible to design the reader that will look for data bracketed by the special control codes and/or designed software that will look for the data bracketed by these special control codes after a standard stop sentinel. Foreign data such as a coupon information, a discount card number or the like may be written in any track that was originally unused or even if used after a stop sentinel is present, and if that foreign data is bracketed by these special control codes then the foreign data will not be read by standard magnetic swipe readers and therefore will be ignored. However, special readers in the software at the host computer for the transaction can look for these control codes and then confine the foreign data and organize it in a manner acceptable for multiple purposes in the individual cards. This makes it possible to have additional information placed on the magnetic stripe card which would not be read by conventional readers in the field but would be obtainable from specialized readers.

BRIEF DESCRIPTION OF THE DRAWINGS

The novel features of the present invention will be understood and appreciated by one of ordinary skill in the art by reference to the following detailed description of the invention taken in conjunction with the accompanying drawings and which:

FIG. 2 is a layout of the conventional ISO track diagram;

FIGS. 3, 4, and 5 are more detailed descriptions of the track layout under a standard ISO-8711 standard; and FIG. 6 is a transaction flow chart of a process for associating identification and personal data in accordance with the method and apparatus of the present invention.

DETAILED DESCRIPTION OF THE INVENTION

Figure 1:
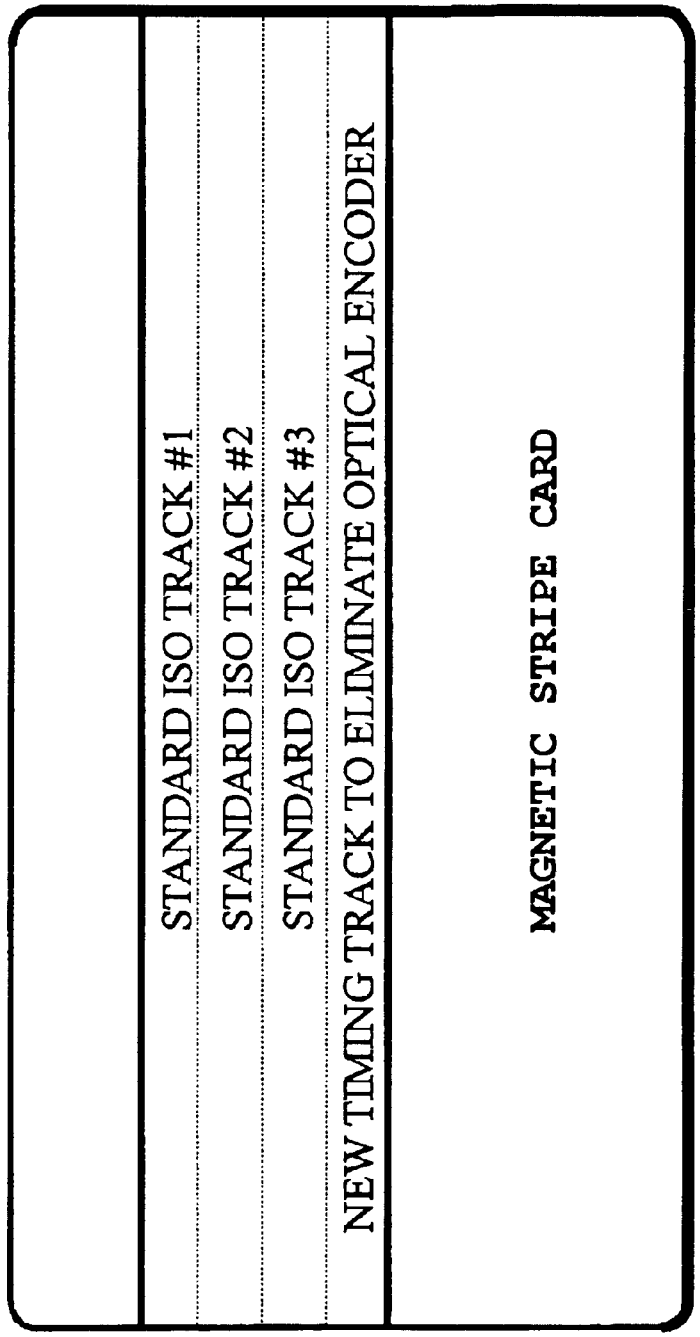
FIG. 1 is a track layout in accordance with one aspect of the present invention.

Applicant has discovered that there are many instances whereby an individual, consumer, entity, organization, etc. would find it desirable to provide others with a secure, customized set of identification data that would facilitate a transaction or event of a specific type. Using the basic principles of the present invention as described in the above referenced prior filed patent application of Applicant, the process is thus described. Referring first to the description and drawings of the above referenced prior filed application of Applicant, it may be seen that FIG. 1 herein shows that an additional timing track 10 can be employed on a card 20 in this invention which may be used to ameliorate the need of an optical encoder in a device such as the wallet consolidator discussed above or in other types of readers. This is provided in that most conventional magnetic stripe readers use a mechanical sensor or optical sensor which is used to detect the speed at which the magnetic stripe card is being read through the stripe reader. By having an additional timing track supplied as an additional track the inventor herein has provided a means by which the reader can be made at a lower cost by using the timing track herein to determine the timing arrangement. However, this additional timing track 10 is not necessary for the operation of this invention, and in fact the conventional encoding and timing mechanism are quite satisfactory.

One of the significant features of this invention is that multiple stripes from various credit cards can be read and consolidated onto one card as is set forth in aforementioned wallet consolidator patent application. One of the unique features of this invention is the ability to take foreign or other sources and to add that material onto a given track on the card. The wallet consolidator uses the individual memory chip or smart chip contained on a card to store information however, this information can also be temporarily stored in the memory of a device such as the wallet consolidator and added to the magnetic stripe. One of the unique features of applicant's invention is the use of the fact that a standard track of one card data format, has an amount of information which is known as discretionary data which can be placed on any given card in any one of the standard three tracks. By using the control code to indicate the type of track is in a different format at using these control codes to "bracket" an individual stream of data and placing this after a standard stop sentinel on a data track a conventional reader would inherently ignore the information contained within this section. However, a specially constructed reader/writer would be able to look for or create these special control codes or the software within the conventional reader could be altered so that upon recognition of these special control codes this additional information could be decoded. This allows for a "hiding" of additional information which can be consolidated onto a given card to be employed and used in a very expeditious manner. Further it will be understood that the sentinels described above need not be employed to practice this invention and that other types of software codes can be used so that a POS terminal either as they exist today or with custom reprogramming can be used to read the additional or foreign information that is to be "added" to conventional tracks. The start and stop sentinels have been described herein as only an example of the types of control codes that can be used to bracket the foreign data that is to be added to the card stripe. Further a control code could be programmed into the stripe that can be recognized by the POS reader to indicate that this is for example a credit card, a second code could indicate that this is a discount or affinity card, and yet a third code could indicate that this is a drivers license. These codes could also be combined in various ways. Prior art systems have not used these special control codes to effectively hide additional data on a given track. This additional information can be used effectively.

Figure 4:
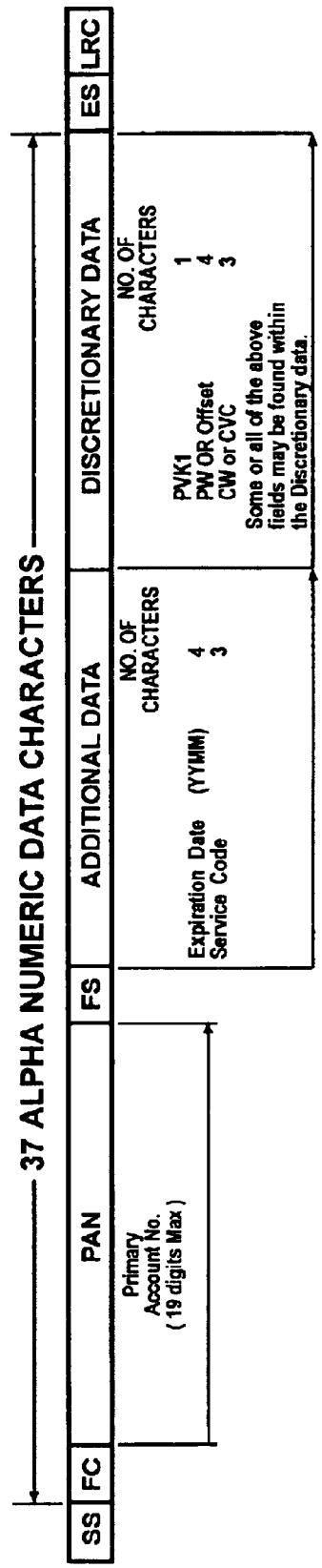

This can be made more clear when one reviews FIGS. 3, 4 and 5 which shows the significant amount of space that is available for "either discretionary data or additional data" on a given track. This is especially true when the 210 bpi track is used. The additional either alpha numeric or numeric characters provides a significant amount of space for additional data to be placed on a given card which has been unavailable in prior art systems. Additionally, as the control code can be used to effectively to "shift" the track concentration from 75 to 210 bpi in the middle of the track additional information can be "hidden" as still be provided to a specially outfitted or programmed reader. Accordingly, additional data can be used and be present on a card which would not be generally readable without the proper equipment or programming.

Referring now to FIG. 6, there is shown a transaction flow chart of a process for associating identification and personal data utilizing the system described above with regard to FIGS. 1–5. As stated above, there are many instances whereby an individual, consumer, entity, organization, etc., would find it desirable to provide others with a secure, customized set of Id data that would facilitate a transaction and or event of a specific type. Additionally, the receiver of the data for the transaction may wish to provide complimenting and supplemental data back to the originator of the transaction and all such transactions being done in a digitized format to be interpreted, manipulated and/or displayed on Point-of sale transaction(POS) devices/computers both at the POS and remotely. Additionally, the process of initializing this secure transaction would be more flexible if the acceptors of the transaction could utilize a Magnetic stripe card that could combine a unique identifying code with the standard ISO data from other completely different financial or other card's magnetically striped data.

FIG. 6 visually illustrates an example of such a transaction as follows:

Individual A would transmit via computer/communication line, his or her personal data, to a remote computer server. In this case a downloaded or scanned personal image, a downloaded or read driver's license, checking account number, credit card, debit card and supermarket frequent purchaser card.

Through server prompted instructions, the individual would be asked to select a password to protect his data, then further prompts could permit him to associate, if he so desired, certain ID and or purchasing (credit/debit/checking account data) with particular transaction types, merchants, etc. In this example he could link the image, drivers license, checking account data and frequent purchaser card data with transactions driven by, for example, a supermarket with which he holds the frequent purchaser card. When shopping at the supermarket chain, he could present a magnetically striped card, smartcard, or radio frequency or infrared PDA transmitted personal ID number. The store POS would read the data, communicate ultimately with the central server, retrieve the customized transaction data, which could be displayed, including the image of the purchaser, on the store POS screen and the purchase would be confirmed with buyer and seller.

The supermarket could then transmit the purchase data back to the central server, including as an example an electronic coupon(s) for future purchases. The supermarket could be empowered by the individual to also transmit at any time to the server, other coupons, discounts offers and or communications which could be read and or redeemed by the customer for future purposes. The system could be expanded to include, by way of examples, membership ID's admittance, hospital, medical insurance, event ticketing, and/or money transfer type transactions. In this fashion, an individual and/or entity could minimize portability issues and facilitate complex identification needs such as biometrics, imaging, and fingerprint technologies.

It will readily be understood by one of ordinary skill in the art that multiple uses of this additional data can be had. Further, it will readily understood that there are numerous rearrangements, modifications or substitutions which are possible and this invention should not be limited without departing from the spirit of this invention as set forth above and defined by the following appended claims:

I claim:

1. A retail system comprising:
    a server configured to store a plurality of personal control ID's and a plurality of sets of personal data, each of the plurality of personal control ID's being associated with a respective different person and a respective set of personal data entered into the server and controlled by said respective different person, the server also being configured to store a data profile derived from a set of personal data associated with a personal control ID identifying a selected different person and assembled together by said selected different person for use by a selected one of one or more providers identified by a provider ID;
    a data processor remote from and in communication with the server;
    a retail point-of-sale (POS) terminal in communication with said data processor, and adapted to couple via a data communication link to an ID instrument to receive from said ID instrument said personal control ID identifying said selected different person and to send said personal control ID identifying said selected different person to said data processor, said data processor being configured to transmit said personal control ID identifying said selected different person and said provider ID identifying said selected provider to said server, the server being further configured to retrieve from said plurality of sets of personal data and transmit to said data processor said data profile derived from said set of personal data associated with said personal control ID identifying said selected different person for use by said selected provider identified by said provider ID; and
    an output device connected to said data processor to receive from said data processor said data profile received from said data server and to output said data profile to said selected provider to thereby verify said personal control ID as being associated with a user of said personal control ID at said retail POS prior to proceeding with a retail transaction.

2. A system as defined in claim 1, wherein said server is further configured to recognize that said personal control ID is being received prior to transmitting to said data processor said data profile derived from said set of personal data associated with said personal control ID identifying said selected different person.

3. A system as defined in claim 2, wherein said ID instrument comprises at least one of a magnetic striped card, a smart card, a bar code, a gift card, an automatic teller machine (ATM) card, a check card, a wallet consolidator, a debit card, a credit card, a smart card, a prepaid card, a personal identification card, a driver's license, a personal computer (PC), a laptop computer, a personal digital assistant (PDA) adapted for infra-red (IR) communication, a check, a keypad, a touchscreen, a voice recognition device, a radio-frequency (RF) device, said RF device comprising at least one of a PDA adapted for RF communication, an RF identification (RFID) tag, and a cell phone.

4. A system as defined in claim 2, wherein said personal data comprises at least one of a personal name, a personal ID, a pictorial image of the person, personal fingerprint data, personal checking account data, driver's license data of said person, personal biometric data, a personal social security number, a personal ID password, a personal data password, credit card data, debit card data, prepaid card data, frequent purchaser data, medical data, bank account data, investment data, coupon data, processed data, points, data generated based on existing personal data, and membership ID data of said person.

5. A system as defined in claim 2, wherein said processor, said POS terminal, and said output device are integrated together to constitute a substantially integrated input/output device.

6. A system as defined in claim 2, wherein said POS terminal comprises at least one of a magnetic card reader, a smart card reader, a bar code reader, an infra-red (IR) receiver, an optical scanner, a transmitter adapted for transmitting a pre-determined signal for activating a response from an RFID tag and for receiving a response back from said RFID tag, and an interface adapted for receiving RF signals from at least one of a cell phone and an RF device.

7. A system as defined in claim 2, wherein said output device comprises at least one of a visual display monitor and a printer.

8. A system as defined in claim 2, wherein said server is further coupled to receive from said processor transaction ID information.

9. A system as defined in claim 2, wherein said server is further connected for receiving from said processor transaction ID information containing information relating to the transaction to be executed, including the type of information needed to execute the transaction and personal ID; and wherein said serve is configured to access said database to retrieve and process said personal data related to said personal ID and restricted according to said transaction ID information.

10. A system as defined in claim 2, wherein said data communication link comprises at least one of a wireless link, a wireline link, wide area network (WAN) link, an infra-red (IR) link, a radio-frequency (RF) link, an optical link, and a magnetic link.

11. A system as defined in claim 2, wherein said data profile is usable in a transaction for at least one of goods, services, grocery items, food, medical services and supplies, insurance premiums, ticketing, a money transfer, and identification services relating to said person.

12. A system as defined in claim 2, wherein said server is configured to receive, said personal ID from said input device and for accessing a database to retrieve and process personal data related to said personal control ID for each of a plurality of persons, providers, and transactions.

13. A system as defined in claim 2, wherein said output device is further configured for generating, in response to receipt of personal data associated with said selected personal ID, information relating to said selected person for purposes of facilitating said transaction and the generation of customer messages.

14. A system as defined in claim 3, wherein said output device is configured for generating, in response to receipt of personal data related to said selected personal ID, incentives to said selected person for making future purchases, said incentives including at least one of a coupon and a discount offer.

* * * * *